US011626989B2

(12) United States Patent
Polehn et al.

(10) Patent No.: US 11,626,989 B2
(45) Date of Patent: Apr. 11, 2023

(54) SYSTEM AND METHOD FOR ALLOCATING MULTI-ACCESS EDGE COMPUTING SERVICES

(71) Applicant: Verizon Patent and Licensing Inc., Arlington, VA (US)

(72) Inventors: Donna L. Polehn, Mercer Island, WA (US); Corey J. Christopherson, Bainbridge Island, WA (US); Fred Weisbrod, Renton, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 254 days.

(21) Appl. No.: 16/360,312

(22) Filed: Mar. 21, 2019

(65) Prior Publication Data
US 2020/0302431 A1 Sep. 24, 2020

(51) Int. Cl.
*H04L 9/32* (2006.01)
*H04L 67/1004* (2022.01)
*H04W 28/08* (2023.01)
*H04L 9/00* (2022.01)

(52) U.S. Cl.
CPC ........ *H04L 9/3213* (2013.01); *H04L 67/1004* (2013.01); *H04W 28/08* (2013.01); *H04L 9/50* (2022.05)

(58) Field of Classification Search
CPC ............ G06Q 20/3674; G06Q 2220/00; H04L 9/0637; H04L 9/3217; H04L 2209/38
See application file for complete search history.

(56) References Cited

U.S. PATENT DOCUMENTS

| 5,920,873 | A  | * | 7/1999  | Van Huben | ............ G06Q 10/04 |
| 2002/0178354 | A1 | * | 11/2002 | Ogg | ................. G07B 17/00733 |
|  |  |  |  |  | 713/155 |
| 2004/0010592 | A1 | * | 1/2004  | Carver | .................... H04L 47/70 |
|  |  |  |  |  | 709/226 |
| 2018/0248880 | A1 | * | 8/2018  | Sardesai | ................ G06Q 10/04 |

(Continued)

FOREIGN PATENT DOCUMENTS

| CN | 11165674 A | * | 7/2018 | ............ H04W 12/06 |
| WO | WO-2018040529 A1 | * | 3/2018 | ......... H04L 12/4633 |
| WO | WO-2020013677 A1 | * | 1/2020 | ............ H04W 12/06 |

OTHER PUBLICATIONS

Menting Liu, et al, Distributed Resource Allocation in Block chain-based Video Streaming Systems with Mobile Edge Computing, Dec. 2018, IEEE, Transactions on Wireless Communications, pp. 2, 3, and 5. (Year: 2018).*

(Continued)

*Primary Examiner* — Jacob C. Coppola
*Assistant Examiner* — Terry Nathan Murray

(57) ABSTRACT

Systems and methods provide decentralized MEC compute services. A network device receives, from a user device associated with a user account, an access request for Multi-access Edge Computing (MEC) services. The user account includes a MEC service token that indicates parameters for the MEC services. The network device validates a user of the user device to access MEC services for the user device; removes, after the validating, the MEC service token from the first user account; and grants, based on the removing, access to a MEC cluster by the user device, wherein granting access includes granting access according to the parameters.

20 Claims, 8 Drawing Sheets

(56) References Cited

U.S. PATENT DOCUMENTS

| | | | | |
|---|---|---|---|---|
| 2018/0352033 A1* | 12/2018 | Pacella | ................... | H04L 67/28 |
| 2019/0141536 A1* | 5/2019 | Bachmutsky | ........... | H04L 47/70 |
| | | | | 709/226 |
| 2020/0084202 A1* | 3/2020 | Smith | ..................... | H04L 67/28 |
| 2020/0134620 A1* | 4/2020 | Aiello | .................... | H04W 4/24 |
| 2020/0274942 A1* | 8/2020 | Mueck | ................ | H04L 67/2804 |

OTHER PUBLICATIONS

Fabio Giust, et al, MEC Deployments in 4G and Evolution Towards 5G, Feb. 2018, ETSI (Year: 2018).*
Sami Kekki, et al, MEC in 5G Networks, Jun. 2018, ETSI (Year: 2018).*
Mandyam, et al, Entity Attestation Tokens, May 2018, Qualcomm Technologies, Inc (Year: 2018).*

\* cited by examiner

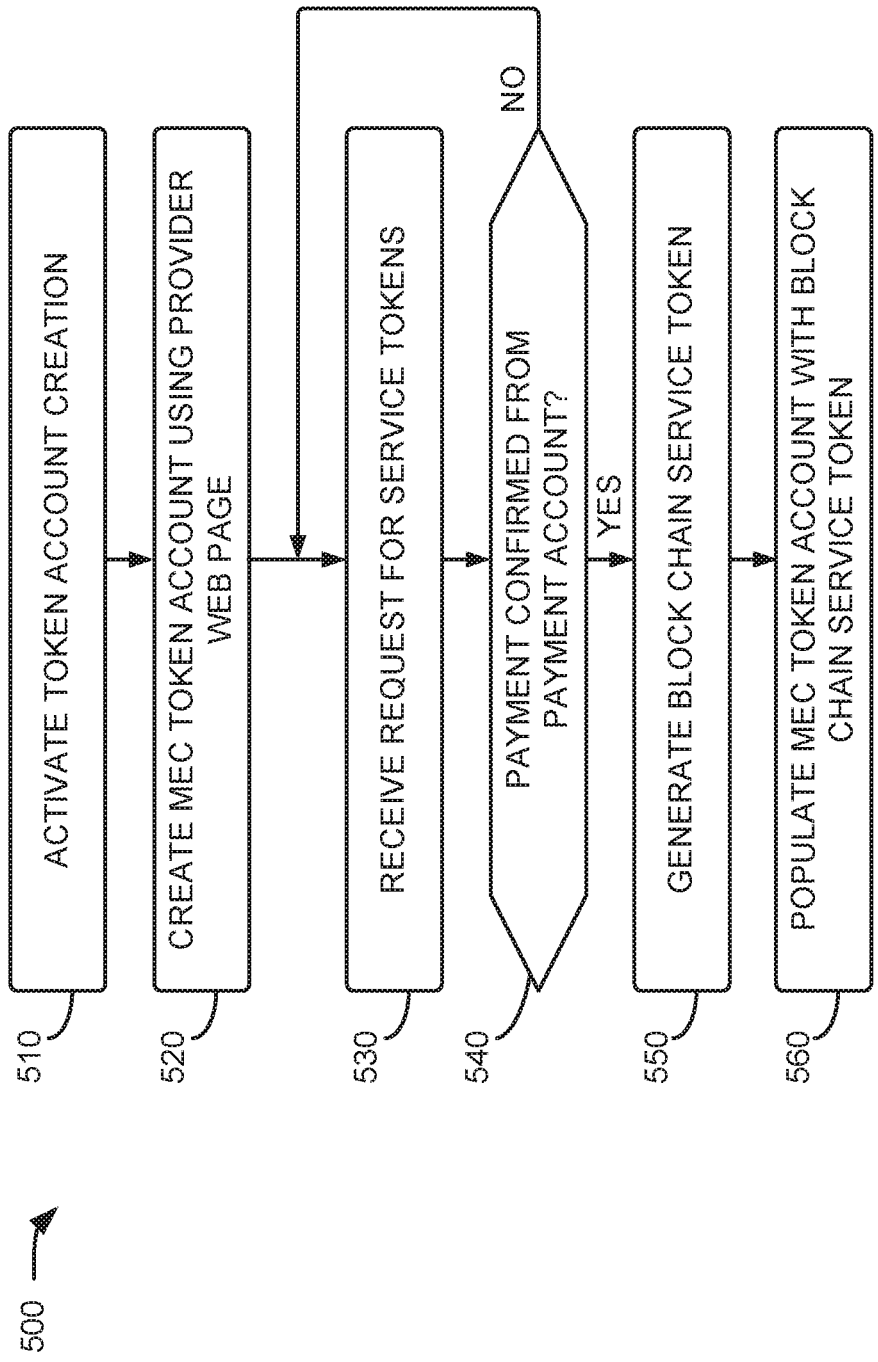

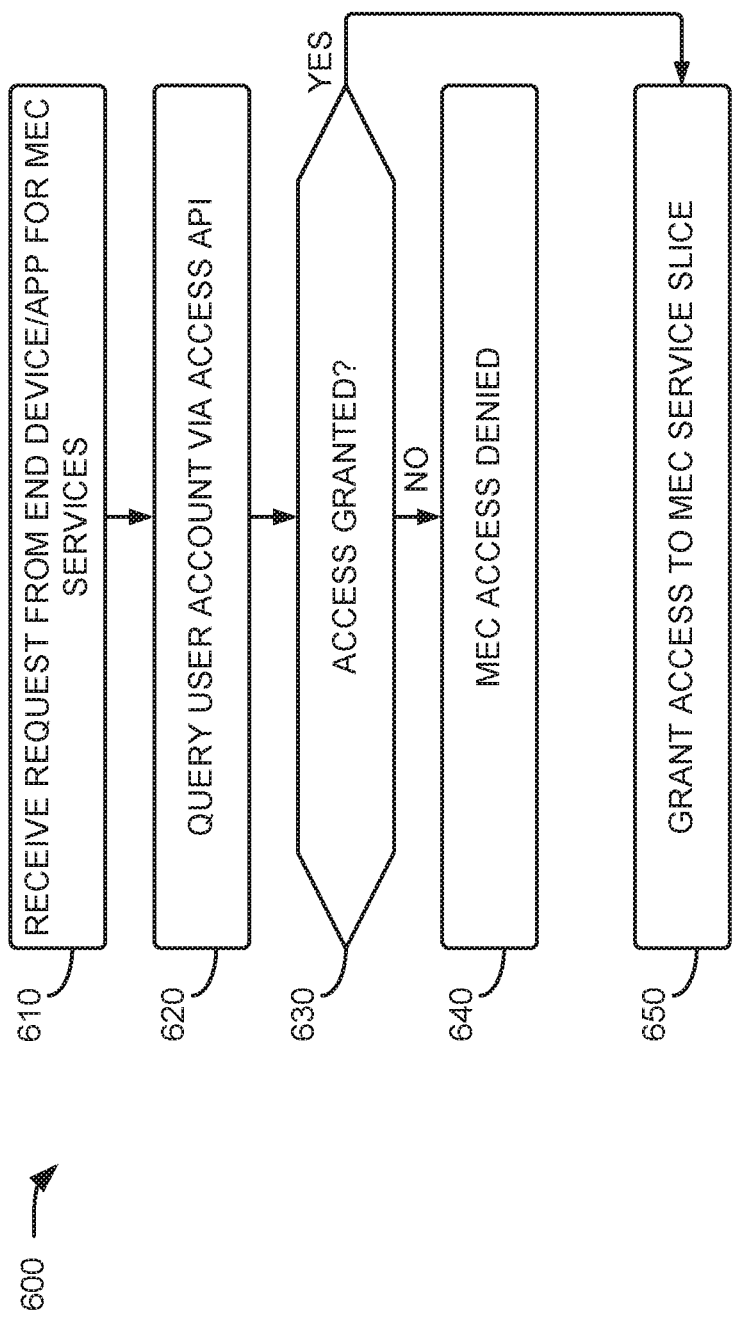

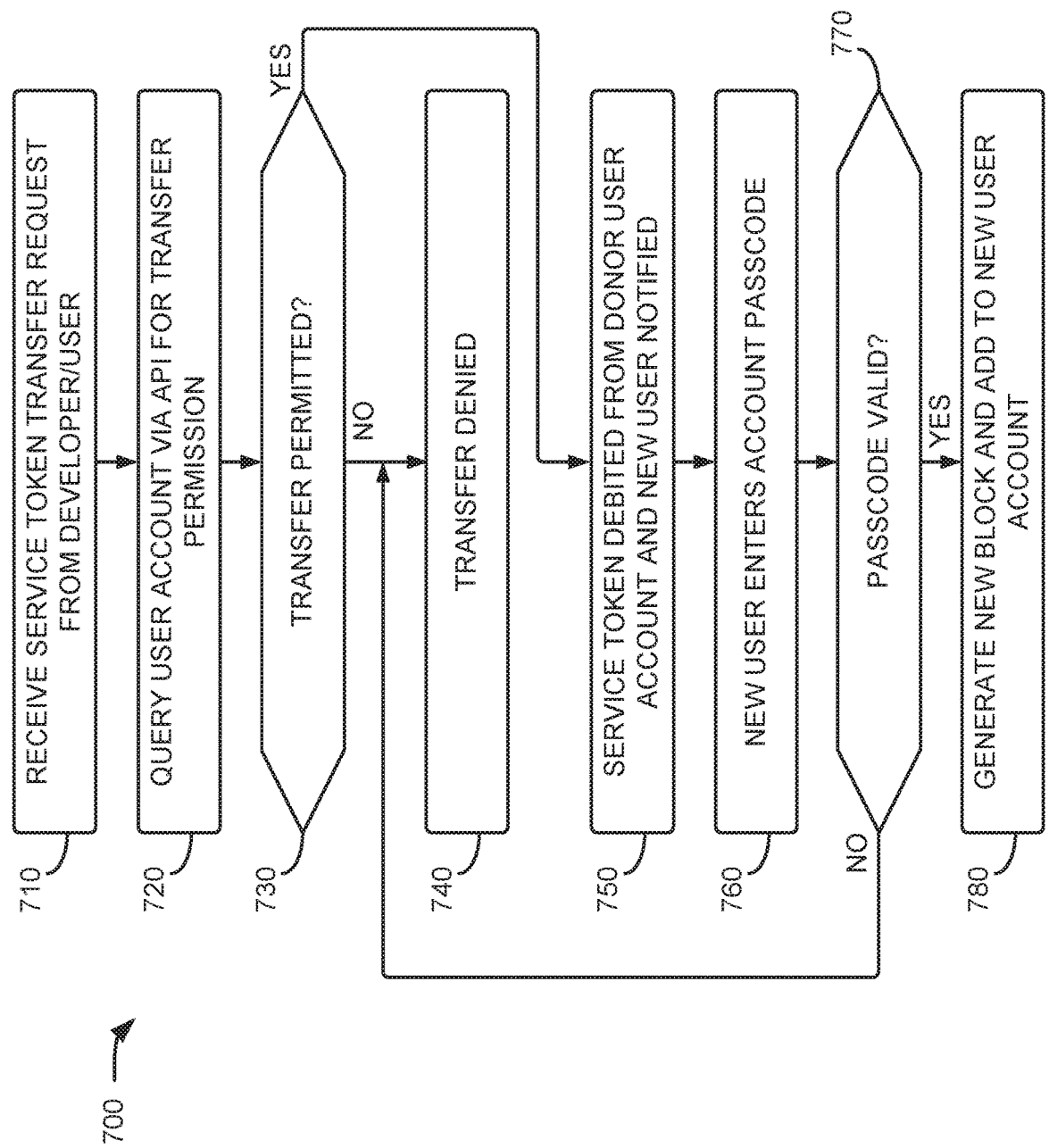

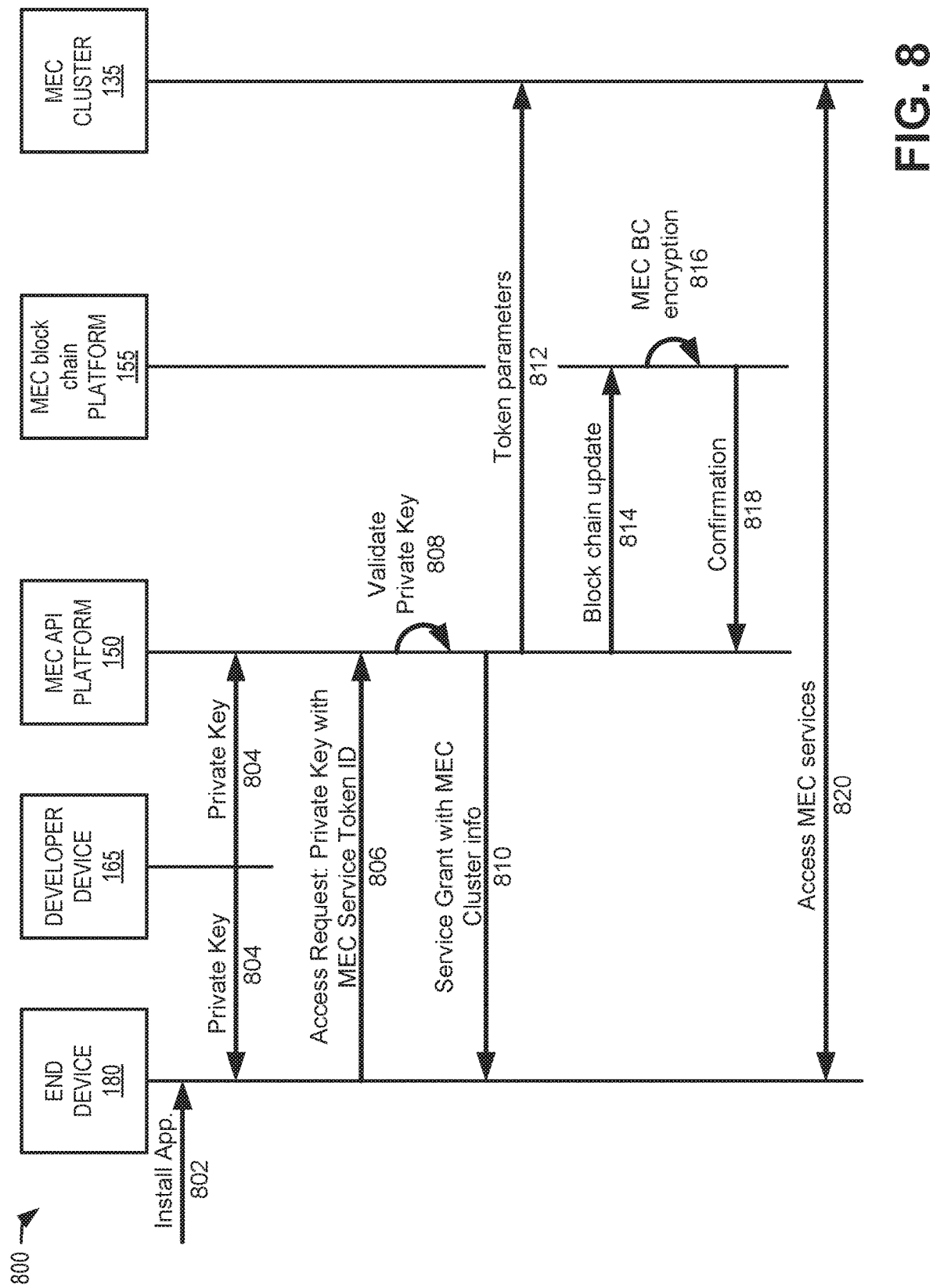

SYSTEM AND METHOD FOR ALLOCATING MULTI-ACCESS EDGE COMPUTING SERVICES

BACKGROUND

One enhancement made possible through new broadband cellular networks is the use of Multi-Access Edge Computing (MEC) platforms (also referred to as Mobile Edge Computing platforms). The MEC platforms allow high network computing loads to be transferred onto edge servers. Depending on the location of the edge servers relative to the point of attachment (e.g., a wireless station for a user device), MEC platforms can provide various services and applications to user devices with minimal latency.

Current compute slicing techniques (e.g., for cloud systems) are implemented using owner/account mechanisms, where the developer may deploy an application (or "app") which requires cloud compute services on a specific service provider (e.g., Amazon® Web Services (AWS), Microsoft Azure®, IBM IOT Bluemix®, etc.) network.

BRIEF DESCRIPTION OF THE DRAWINGS

FIG. 5 is a flow diagram illustrating an exemplary process for instantiating a service token, according to an implementation described herein;

FIG. 6 is a flow diagram illustrating an exemplary process for accessing compute services via a service token, according to an implementation described herein;

FIG. 7 is a flow diagram illustrating an exemplary process for transferring a service token for compute services, according to an implementation described herein; and FIG. 8 is a diagram illustrating a use case for using MEC service tokens, according to an implementation described herein.

DETAILED DESCRIPTION OF PREFERRED EMBODIMENTS

Figure 1:
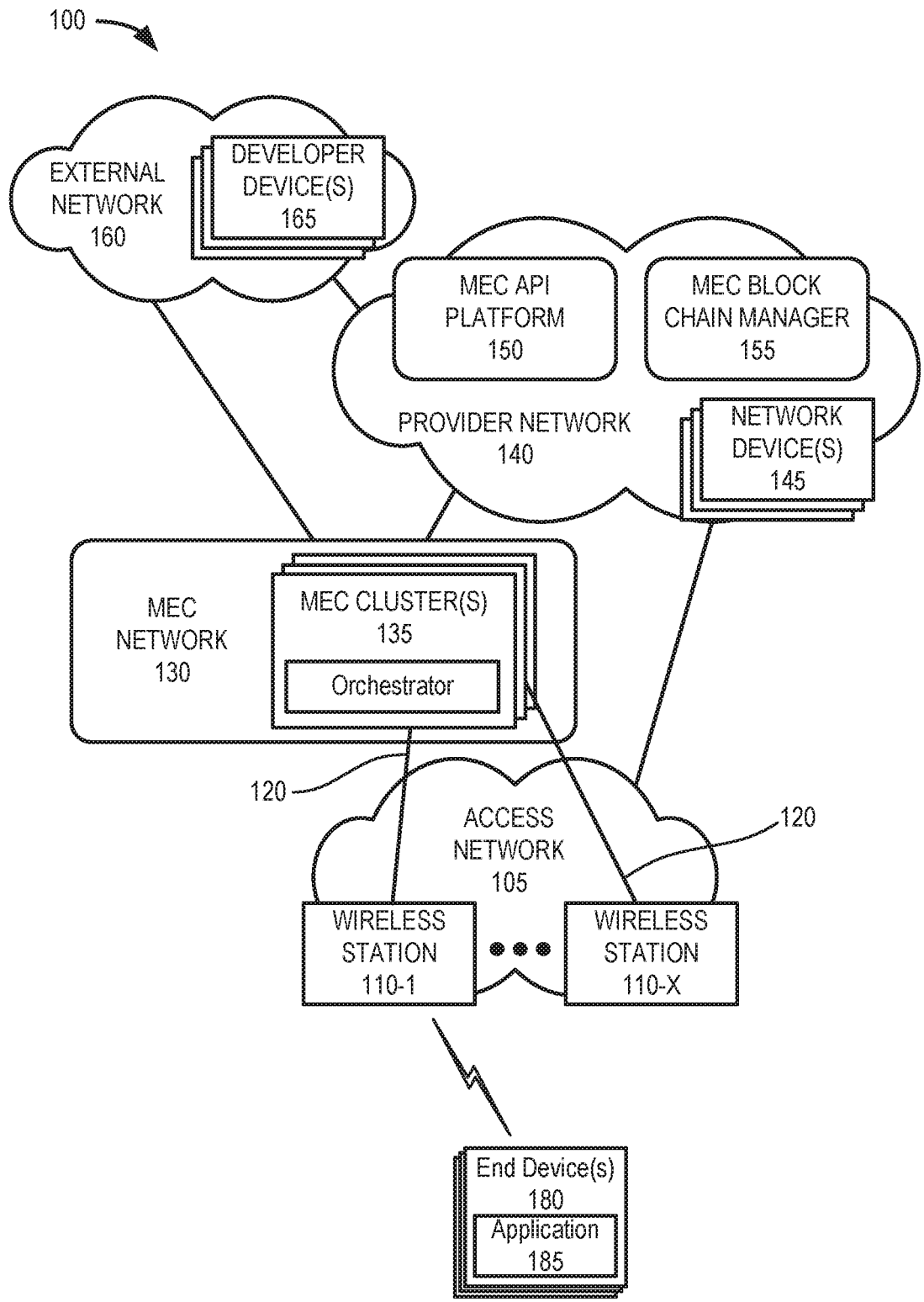
FIG. 1 is a diagram illustrating an exemplary network environment in which systems and/or methods described herein may be implemented.

The following detailed description refers to the accompanying drawings. The same reference numbers in different drawings may identify the same or similar elements.

Apps running on user devices can take advantage of MEC compute resources to provide enhanced services. For example, an app may offload compute tasks to a MEC platform that can provide services faster than other cloud-based services or a local user device processor. Typically, the app user or the app provider will incur these offload compute costs, and analytics may be gathered by multiple parties, including the developer, the MEC provider, etc. There currently is no efficient way for a user to anonymously use MEC compute services and no good ways for the cost to be allocated, exchanged, or traded.

As described further herein, the anonymizing cryptographic aspects of block chain technology can be applied to MEC platforms to allocate, manage, and monitor MEC services, as well as introduce new applications of cloud-based compute slicing. Block chain technology may be implemented whereby the block chain content is a coded service unit. As used herein, a coded service unit may correspond to any type of computing metric, such as compute time, central processing unit (CPU) cycles, specialized computer resources (e.g., GPU cycles, video processing, etc.), bandwidth, storage, or another resource usage metric.

Service units may be allocated based on service tokens (also referred to herein as measure of compute usage MEC service tokens). Remuneration for service tokens can be via outside payment application programming interfaces (APIs), such as APIs for credit card transactions, cryptocurrency, online payment systems, etc. Users can accept new service tokens into a user account, deliver a service token to another user's account, or exchange service tokens for other credits.

According to implementations described herein, block chain encryption technology may be applied to provide a token-based MEC resource service. Using block chain encryption technology, service tokens for MEC compute services are used to control access to virtual machines, containers, or other compute slicing approaches. Thus, the service token is used to create fungible compute services. Compute services may include, for example, MEC-based graphics processing, general processing, random access memory use, storage, etc.

In one implementation, a network device receives, from a user device associated with a user account, an access request for MEC services. The user account may include a MEC service token, which may have been previously provided via an application registration process. The service tokens may indicate parameters for the MEC services, such as time limits, resource limits or another measure of compute usage. The network device may validate a user of the user device to access MEC services for the user device; removes, after validating the user, the MEC service token from the first user account; and grants, based on the removing, access to a MEC cluster that provides the MEC services to the user device, wherein granting access includes granting access according to the parameters.

FIG. 1 illustrates an exemplary environment 100 in which an embodiment of the token-based MEC resource service may be implemented. As illustrated, environment 100 includes an access network 105, a MEC network 130, a provider network 140, and an external network 160. Access network 105 may include wireless stations 110-1 through 110-X (referred to collectively as wireless stations 110 and generally as wireless station 110). MEC network 130 may include MEC clusters 135; provider network 140 may include network devices 145, a MEC API platform 150, and a MEC block chain manager 155; and external network 160 may include developer devices 165. Environment 100 further includes one or more user devices 180.

The number, the type, and the arrangement of network device and the number of user devices 180 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the networks, between the network devices, and between user devices 180 and the network devices. Environment 100 may be implemented to include wired, optical, and/or wireless communication links among the network devices and the networks illustrated. A connection via a communication link may be direct or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 105 may include one or multiple networks of one or multiple types and technologies. For example, access network 105 may include a Fourth Generation (4G) RAN, a 4.5G RAN, a 5G RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, a next generation (NG) RAN, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to wireless stations 110 and/or provider network 140.

Depending on the implementation, access network 105 may include one or multiple types of wireless stations 110. For example, wireless station 110 may include a next generation Node B (gNB), an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.)), or another type of wireless node. Wireless stations 110 may connect to MEC network 130 via backhaul links 120. According to various embodiments, access network 105 may be implemented according to various wireless technologies (e.g., radio access technology (RAT), etc.), wireless standards, wireless frequencies/bands, and so forth.

MEC network 130 includes a platform that provides services at the edge of a network. MEC network 130 may be implemented using one or multiple technologies including, for example, network function virtualization (NFV), software defined networking (SDN), cloud computing, or another type of network technology. Depending on the implementation, MEC network 130 may include, for example, virtualized network functions (VNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.).

For purposes of illustration and description, MEC clusters 135 include the various types of network devices that may be resident in MEC network 130. MEC clusters 135 may be located to provide geographic proximity to various groups of wireless stations 110. Some MEC clusters 135 may be co-located with network devices 145 of provider network 140. According to some exemplary embodiments, each MEC cluster 135 may include a MEC orchestrator. The MEC orchestrator may, among other functions, apply parameters from MEC service tokens to enforce a token-based MEC resource service for user devices 180. In other implementations, parameters from MEC service tokens may be extracted by another network device (e.g., MEC API platform 150) and be provided to the MEC orchestrator for implementation.

Provider network 140 may include one or multiple networks of one or multiple network types and technologies to support access network 105. For example, provider network 140 may be implemented to include a next generation core (NGC) network for a 5G network, an Evolved Packet Core (EPC) of an LTE network, an LTE-A network, an LTE-A Pro network, and/or a legacy core network. Depending on the implementation, provider network 140 may include various network devices 145, such as for example, a user plane function (UPF), an access and mobility management function (AMF), a session management function (SMF), a unified data management (UDM) device, an authentication server function (AUSF), a network slice selection function (NSSF), and so forth. According to other exemplary implementations, provider network 140 may include additional, different, and/or fewer network devices than those described. For purposes of illustration and description, network devices 145 may include various types of network devices that may be resident in provider network 140, as described herein.

MEC API platform 150 may include a distributed network to respond to API calls from user devices 180 and other devices (e.g., developer devices 165 in external network 160). An API may use a collection of functions and procedures, referred to as API calls that can be executed by other applications. For example, as described further herein, MEC API platform 150 may receive API calls from an application (e.g., an application 185 residing on user device 180) to perform block chain management to obtain service tokens for MEC resources. In one implementation, MEC API platform 150 may include logic that allows for validating an API call from user device 180 before granting MEC service tokens to a user's account. After the service tokens are allocated to the user account, MEC API platform 150 may also receive from user device 180 an access request API call for MEC services. MEC API platform 150 may validate a user of user device 180, remove (or debit) the MEC service token from the user account, grant user device 180 access to services from MEC cluster 135.

MEC block chain manager 155 may authorize access for MEC resources, manage user accounts, and provide administrative functions, such as tracking MEC service tokens. According to one implementation, MEC block chain manager 155 may include one or more network devices that participate in validation of block chain ledger entries. In one implementation, MEC block chain manager 155 may communicate with service nodes in a distributed consensus network (not shown). MEC block chain manager 155 may maintain a continuously-growing list of records referred to herein as a "block chain ledger," which is secured from tampering and revision. Each version of the block chain ledger may contain a timestamp and a link to a previous version of the block chain ledger. The authorization is added in chronological order to the block chain ledger as a cryptographically secured block. Each entry of the block chain ledger may be considered a node in a hash tree structure for efficiency. This hash tree ensures that blocks received from MEC block chain manager 155 are received undamaged and unaltered, and enables MEC block chain manager 155 to check that the other applications do not add fraudulent or inaccurate blocks in the block chain ledger.

External network 160 may include one or multiple networks. For example, external network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, external network 160 may include various developer devices 165 that provide various applications, services, or other type of user device assets, such as servers (e.g., web, application, cloud, etc.), mass storage devices, data center devices, and/or other types of network services pertaining to various network-related functions. According to an implementation, developer devices may use APIs to request (from MEC API platform 150) access to MEC services. In response to receiving the request, MEC API platform 150 may initiate creation of dedicated MEC service tokens for managing MEC services to instances of an application (e.g., application 185).

User device 180 includes a device that has computational and wireless communication capabilities. User device 180 may be implemented as a mobile device, a portable device, a stationary device, a device operated by a user, or a device not operated by a user. For example, user device 180 may be implemented as a Mobile Broadband device, a smartphone, a computer, a tablet, a netbook, a wearable device, a vehicle support system, a game system, a drone, or some other type of wireless device. According to various exemplary embodiments, user device 180 may be configured to execute various types of software (e.g., applications, programs, etc.). User device 180 may support one or multiple RATs (e.g., 4G, 5G, etc.), one or multiple frequency bands, network slicing, dual-connectivity, and so forth. Additionally, user device 180 may include one or multiple communication interfaces that provide one or multiple (e.g., simultaneous or non-simultaneous) connections via the same or different RATs, frequency bands, etc. As described further herein, user device 180 may download and/or register application 185. The application (or "app") may be designed to use MEC compute resources. More particularly, application 185 may include a MEC service token block identifier associated with the particular developer, which application 185 may use to obtain MEC service tokens.

Figure 2:
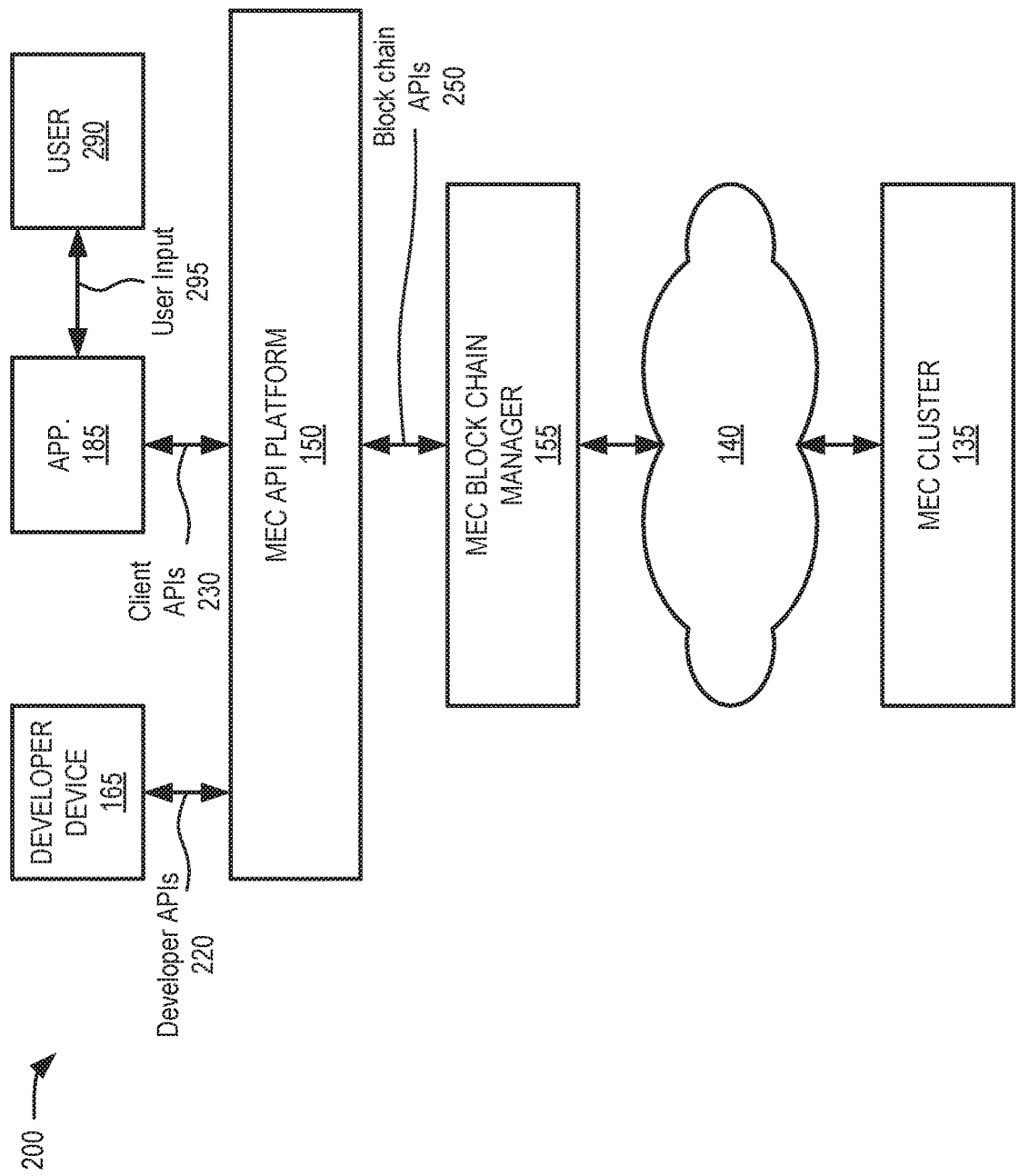
FIG. 2 is a diagram illustrating exemplary communications in a portion of the network environment of FIG. 1.

FIG. 2 is a diagram illustrating exemplary communications in a portion 200 of network environment 100. As shown in FIG. 2, network portion 200 may include MEC cluster 135, provider network 140, MEC API platform 150, MEC block chain manager 155, developer device 165, and application 185.

Developer device 165 may register with MEC API platform 150 using secure credentials and use developer APIs 220 to obtain API formats for applications implementing MEC services. For example, MEC API platform 150 may include a library of API commands that may be used by developers to configure applications (e.g., applications 185) for selectively using MEC resources, managing and transferring MEC service tokens, and allocating MEC service tokens. In one implementation, developer APIs 220 may be used to obtain block chain identifiers for application 185 and provide private keys (or passcodes) for user authentication.

Application 185, residing on user device 180, may register with MEC API platform 150 to obtain authentication codes and/or private keys. Application 185/user device 180 may use client APIs to request and transfer MEC service tokens. In one implementation, application 185 may send a request using client API 230 to MEC API platform 150 to obtain MEC service tokens. The request may use, for example, an API call for the particular MEC service and/or application. The API call may cause MEC API platform 150 to initiate a block chain activity in MEC block chain manager 155. Additionally, application 185 may send a request using client API 230 to use/expend MEC service tokens.

MEC API platform 150 may implement several types of functions using APIs, including generally block chain management and MEC compute slice management. APIs for block chain management may ensure (1) payment processing for MEC service tokens (2) the provider network securely delivers MEC tokens to a user account, and (3) monitoring for proper MEC use. APIs for MEC compute slice management may manage use of MEC service tokens to ensure compute services are granted in exchange for service tokens. The service tokens may include parameters to manage MEC cluster services. In one implementation, a MEC service token may include parameters for a preconfigured duration of time, such as a one hour block of time or another duration. In another implementation, MEC service tokens may include parameters for use during a certain period, such as during a particular time window. In other implementations, parameters may include a limit on use of a network resource, such as a bandwidth limit, CPU or GPU usage limits (e.g., a number of compute cycles), a memory limit, or other specified functions (e.g., virtual functions, hardware functions, etc.) for the MEC cluster. In still another implementation, a MEC service token may provide unlimited use for a particular session or activity associated with an application (e.g., a game play session, a transaction, etc.).

API calls from developer APIs 220 and/or client APIs 230 may cause MEC API platform 150 to initiate backend APIs via MEC block chain manager 155. In one implementation, MEC API platform 150 may use block chain APIs 250 to generate an API call to MEC block chain manager 155. Execution of block chain APIs 250 may, for example, result in execution of a set of block chain function(s). For example, MEC API platform 150 may use block chain APIs 250 to initiate an update to a block chain ledger to reflect the debiting/removal of a MEC service token from a user's account. As another example, MEC API platform 150 may use block chain APIs 250 to initiate an update to a block chain ledger to reflect the transferring of a MEC service token from one account to another.

As shown in FIG. 2, network portion 200 can provide a secure compute service slicing system using block chain concepts to create decentralized MEC compute services. Block chain is a cryptographic system used here to transfer compute service tokens that control access to virtual machine, container, lambdas or other similar compute slicing approaches. As used herein the block chain token may be used to create fungible compute services provided by MEC clusters 135.

For example, assume a user 290 installs an application (e.g., application 185) on user device 180. Further assume application 185 requires backend compute services to act on user activity. For example, application 185 may include a virtual reality or gaming component that requires high processing loads with low latency. As described further herein, the developer may arrange with provider network 140 to allow application 185 to utilize MEC clusters 135 (e.g., via user of MEC service tokens).

The application developer (e.g., developer device 165) may provide user 290 with a private key (e.g., via an email, text, or other communication) that is also provided to MEC API platform 150. User 290 may input the private key via user input 295. Application 185 may combine the private key with a block chain identifier included with the application and submit, via API 230, a request for MEC service tokens. In response, MEC API platform 150 may create a user account, which can be populated with MEC service tokens. The user's account can then expend the MEC service tokens via any user device 180 to enable use of MEC services.

Figure 3:
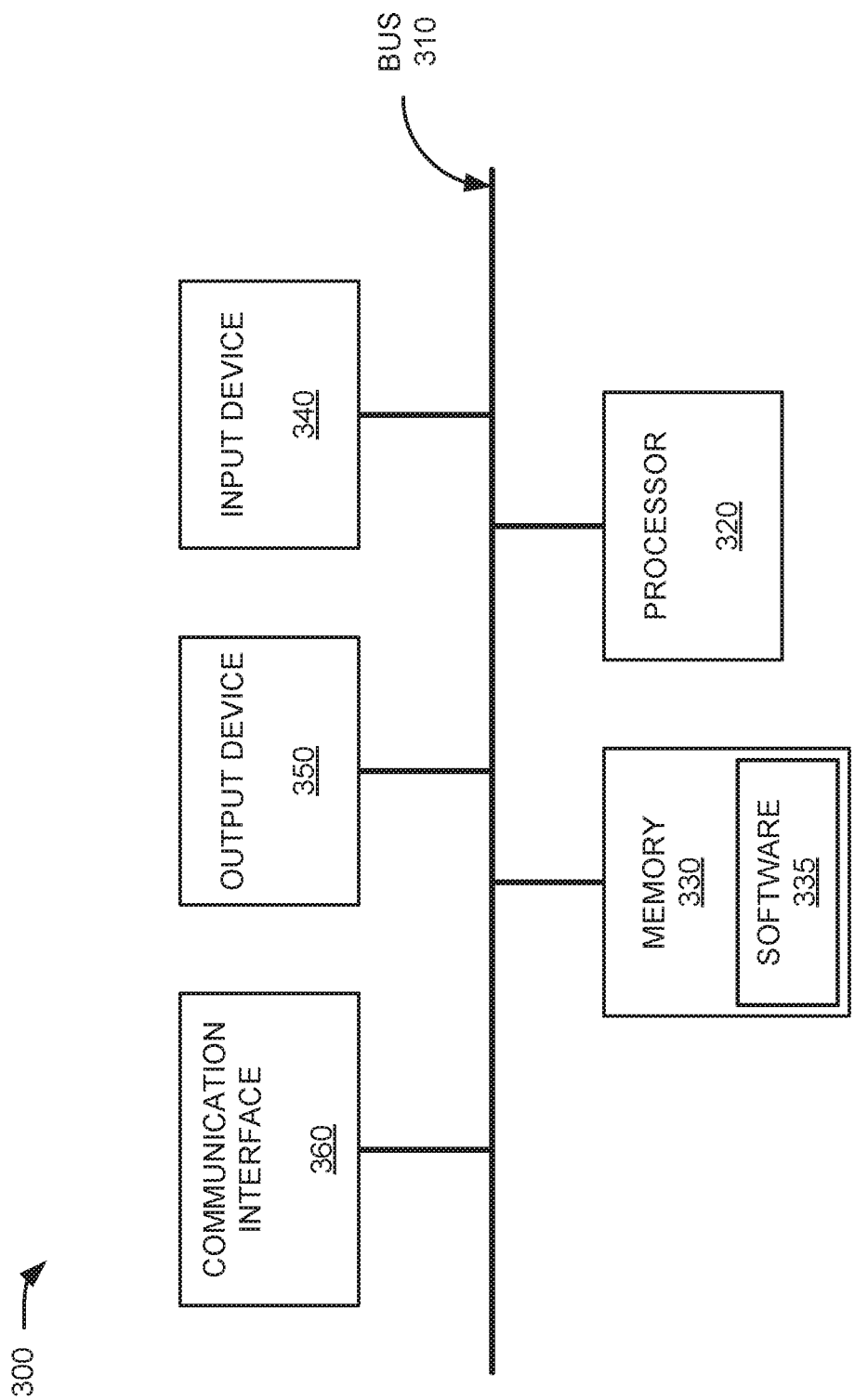
FIG. 3 is a block diagram illustrating exemplary components of a device that may correspond to one of the devices of FIG. 1.

FIG. 3 is a diagram illustrating exemplary components of a device 300, according to an implementation described herein. Each of MEC clusters 135, network devices 145, MEC API platform 150, MEC block chain manager 155, developer device 165, and user device 180 may be implemented as a combination of hardware and software on one or more of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320.

Software 335 includes an application or a program that provides a function and/or a process. Software 335 is also intended to include firmware, middleware, microcode, hardware description language (HDL), and/or other form of instruction. By way of example, when device 300 is a user device 180, software 335 may include an application 185 to request, store, and/or implement MEC service tokens.

Input component 340 may include a mechanism that permits a user to input information to device 300, such as a keyboard, a keypad, a button, a switch, touch screen, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of RF signals. For example, communication interface 360 may include one or more antennas to transmit and/or receive RF signals over the air. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Device 300 may perform certain operations in response to processor 320 executing software instructions (e.g., software 335) contained in a computer-readable medium, such as memory 330. A computer-readable medium may be defined as a non-transitory memory device. A non-transitory memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Device 300 may include fewer components, additional components, different components, and/or differently arranged components than those illustrated in FIG. 3. As an example, in some implementations, a display may not be included in device 300. As another example, device 300 may include one or more switch fabrics instead of, or in addition to, bus 310. Additionally, or alternatively, one or more components of device 300 may perform one or more tasks described as being performed by one or more other components of device 300.

Figure 4:
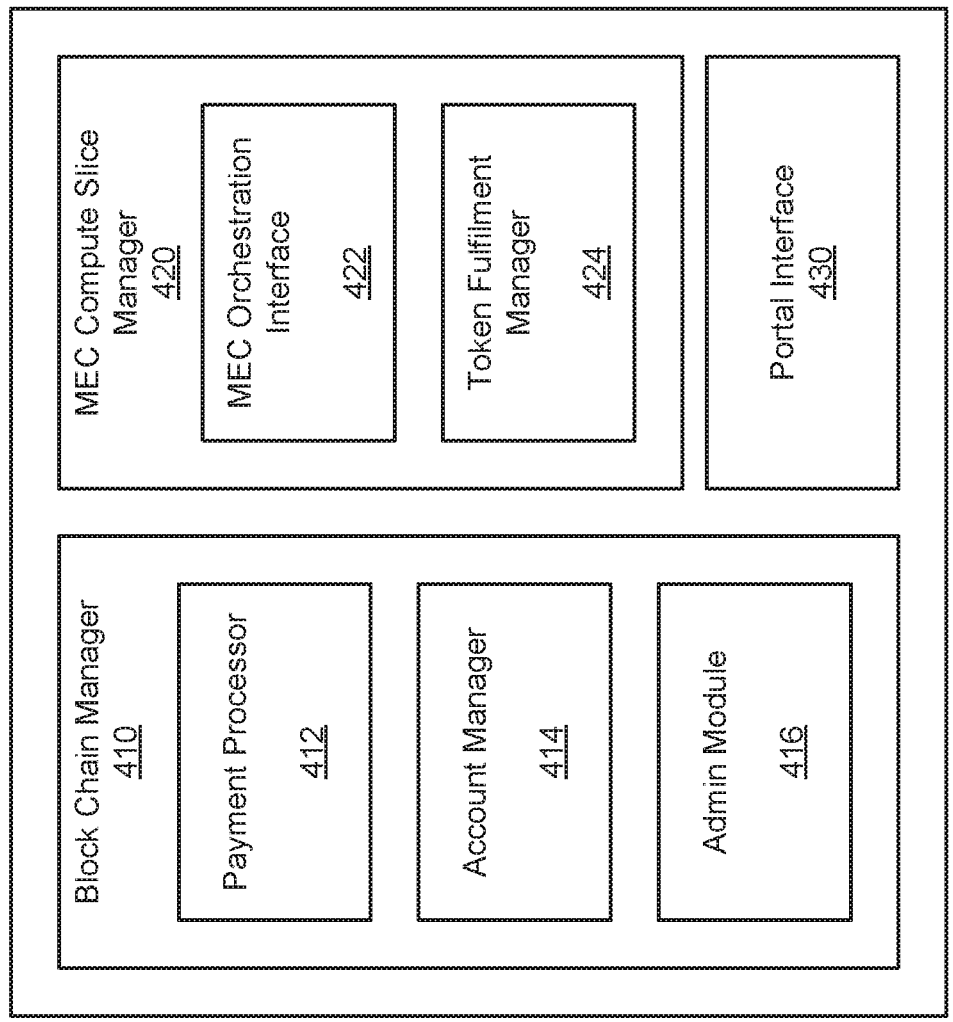
FIG. 4 is a diagram of exemplary functional components of the Multi-access Edge Computing (MEC) application programming interface (API) platform of FIGS. 1 and 2.

FIG. 4 is a diagram of functional components of MEC API platform 150. The functional components of FIG. 4 may be implemented, for example, by processor 320 in conjunction with memory 330/software 335. As shown in FIG. 4, MEC API platform 150 may include a block chain manager 410, a MEC compute slice manager 420, and a portal interface 430.

Block chain manager 410 may authorize access for MEC service tokens, manage MEC user accounts, and provide administrative functions, such as tracking MEC service token activity. As shown in FIG. 4, block chain manager 410 may include a payment processor 412, a account manager 414, and an administrative module 416.

Payment processor 412 may support account-based or third-party-based billing for MEC service tokens. Generally, payment processor 412 may confirm an instrument is in place for charging and accepting token payments before approving block fulfilment (e.g., creation of a new block in a MEC service token for MEC block chain platform 155). In one implementation, payments for MEC services may be included as part of an account with a service provider. In another implementation, MEC services may be provided through a sharing/rental plan or a per-transfer plan. For example, payment processor 412 may implement an on-line payment system (e.g., credit card payments, electronic funds transfer, on-line payment services, electronic currency, etc.) before authorizing a new block for a MEC service token. Payment processor 412 may also account for exchange rates of different denominations for international transactions (such as when a user is roaming, for example, on overseas travel).

Account manager 414 may provide an interface for users to view, track, transfer, and manage MEC service tokens. In one implementation, a MEC service token may be associated with a particular application 185. In another implementation, a MEC service token may be associated with an account including multiple user devices 180 or multiple applications 185. A MEC service token user account may include a record of MEC service tokens available to a user and a record of which MEC service token may be currently assigned to a user device 180.

Account manager 414 may use a user-facing API to create a MEC service token account for a user of a MEC service token. Account manager 414 may provide a block store containing an encrypted MEC service token. Account manager 414 may provide a vehicle for a user to send a MEC service token to another user and to receive payment/credit in return. For example, a user may send a MEC service token to another user in exchange for payment or other credit.

Administrative module 416 may provide activity monitoring for MEC service tokens. For example, administrative module 416 may log use time of MEC service tokens per device, data usage per MEC service token and per device, etc. Administrative module 416 may also provide other administrative functions, such as profile settings, use restrictions, automatic MEC service token transfers, and other user configurable settings for MEC service token use. According to another implementation, administrative module 416 may communicate with the MEC orchestrator(s) of MEC clusters 135 to account for partial token usage, such as when an application 185 uses only a portion of a resource/parameter allocated by a service token to complete a task. The MEC orchestrator may, for example, maintain a log of unused MEC resources from the service token that can be available to the application in future session. The MEC orchestrator may "return" unused resources from MEC service tokens by informing administrative module 416. In response, administrative module 416 may, for example, generate an updated/new token for the user's account to credit the unused resources back to the user.

MEC compute slice manager 420 may coordinate the reservation and allocation of MEC resources via MEC service tokens. In one implementation, MEC compute slice manager 420 may include a MEC orchestration interface 422 and a token fulfilment manager 424.

MEC orchestration interface 422 may provide MEC service tokens (e.g., block chain blocks) to a MEC cluster 135 for authorized applications. For example, an application 185 may use a client API (e.g., API 230) with a previously obtained MEC service token to submit a request for MEC compute slice services. MEC orchestration interface 422 may provide the token or parameters extracted from the token to enable MEC cluster 135 to provide regulated services for application 185.

Token fulfilment manager 424 may authenticate an application 185 of user device 180 and/or the particular user device 180. For example, token fulfilment manager 424 may store user credentials and may request/receive login information (e.g., authentication codes, passcodes, etc.) associated with the user and compare the login information with the stored credentials to authenticate the user. Additionally, or alternatively, token fulfilment manager 424 may request/receive device information (e.g., a unique device identifier) associated with user device 180 and may compare the device information with stored information to authenticate user device 180. In one implementation, token fulfilment manager 424 may verify authentication whenever a user device 180 or user attempts to request MEC services, and/or transfer a MEC service token.

Portal interface 430 may include a web-based user interface to solicit user input. For example, when application 185 is installed on user device 180, application 185 may automatically link to portal interface 430 to solicit user input for registration purposes. Using portal interface 430, a user of user device 180 may create a MEC token account or link to an existing MEC token account. Additionally, portal interface 430 may announce MEC service token transfers and request confirmation.

FIG. 5 is a flow diagram illustrating an exemplary process 500 for creating a user account (also referred to as a "token account") for MEC service tokens. Process 500 may also instantiate MEC service tokens into the user account. In one implementation, process 500 may be performed by MEC API platform 150. In another implementation, process 500 may be performed by MEC API platform 150 in conjunction with MEC block chain platform 155 or other network devices in network environment 100.

Process 500 may include activating token account creation (block 510), and creating a MEC token account using a provider web page (block 520). For example, when application 185 is installed on user device 180, the application may automatically link to a portal (e.g., via portal interface 430) for MEC API platform 150. Using the portal, a user of user device 180 may create a MEC token account or access an existing MEC wallet account. User device 180 may access a web interface for MEC API platform 150 via a local LAN (e.g., using WI-FI, BLUETOOTH, etc.) or another type of wireless connection. In another implementation, a MEC token account may be created for a user by a service provider representative using a telephone support system. The MEC token account may include, for example, a user identifier, an application identifier, eligible devices, etc. associated with the user. An authentication code selected by the user (e.g., passcode or another form of authentication) may be associated with the MEC token account and stored to verify future MEC service token requests. The MEC token account may be stored, for example, in a memory (e.g., memory 330) associated with MEC API platform 150.

Process 500 may also include receiving a request for service tokens (block 530), and determining if payment can be confirmed from a payment account (block 540). For example, after the user creates a MEC token account (or it is created for them via a portal mechanism), the MEC token account can be populated with MEC service tokens. MEC API platform 150 may receive a request for service tokens via a token request API, which may be initiated through application 185, for example. MEC API platform 150 may initiate a debit payment from a user account (e.g., a credit card, electronic check, e-currency, etc.) or from an account associated with application 185.

If a payment cannot be confirmed from the payment account (block 540—No), process 500 may return to process block 530. For example, MEC API platform 150 may deny the request for service tokens and await a further request. If the payment is confirmed from the payment account (block 540—Yes), process 500 may proceed to generate a block chain service token (block 550) and populate the MEC token account with the block chain service token (block 560). For example, assuming MEC API platform 150 successfully processes a payment, MEC API platform 150 may populate the MEC token account with one or more MEC service tokens via a block chain API 250. In one implementation, MEC API platform 150 may send a request to MEC block chain platform 155 to generate hashed content for each block of a MEC service token. For example, using API 250, MEC API platform 150 may submit a request to MEC block chain platform 155 to generate an activation block for a new MEC service token. In one implementation, the activation block may be the first block in a block chain for the new MEC service token. Each MEC service tokens may include a list of services to which the MEC service token can provide access. In one implementation, the MEC token account may include different MEC service tokens for different service providers (e.g., different cloud compute service providers). MEC API platform 150 can then allocate or assign a MEC service token to enable use of the MEC service tokens with certain providers. In one implementation, only one allocation of a MEC service token at time can be issued.

FIG. 6 is a flow diagram illustrating an exemplary process 600 for expending MEC service tokens. In one implementation, process 600 may be performed by MEC API platform 150. In another implementation, process 600 may be performed by MEC API platform 150 in conjunction with MEC block chain platform 155 or other network devices in network environment 100.

Process 600 may include receiving a request, from an application on a user device, for MEC services (block 610), querying a user account for available service tokens (block 620), and determining if access to the MEC services can be granted (block 630). For example, application 185 on user device 180 may use an API call to query MEC block chain platform 155 for MEC service tokens. As part of the API, MEC API platform 150 may require a user to enter a passcode or another form of authentication. MEC API platform 150 may verify the user's passcode to determine if access to the MEC services can be granted.

If access to the MEC services cannot be granted (block 630—No), process 600 may include denying the request for MEC services (block 640). If access to the MEC services can be granted (block 630—Yes), process 600 may include granting access to the MEC service slice (block 650). For example, if MEC API platform 150 fails to validate the user passcode, MEC API platform 150 may deny MEC services to user device 180/application 185. If MEC API platform 150 validates the user passcode, an available MEC service token from the user's account may be removed/expended and use rights for MEC services are transferred to user device 180/application 185.

FIG. 7 is a flow diagram illustrating an exemplary process 700 for transferring MEC service tokens. In one implementation, process 700 may be performed by MEC API platform 150. In another implementation, process 700 may be performed by MEC API platform 150 in conjunction with MEC block chain platform 155 or other network devices in network environment 100.

Process 700 may include receiving a service token transfer request (block 710), and querying a user account for transfer permission (block 720). For example, a user (via user device 180) or developer (via developer device 165) may submit an API call to initiate a MEC service token transfer. The API call may include an account identifier for a recipient of the transferred service token. As part of the API, MEC API platform 150 may also require a user to enter a passcode or another form of authentication. MEC API platform 150 may verify the user's passcode to determine if (1) access to the MEC token account can be granted and (2) a MEC service token is available for transfer.

If transfer of the MEC service token is not permitted (block 730—No), process 700 may include denying the transfer request (block 740).

If transfer of the MEC service token is permitted (block 730—Yes), process 700 may include debiting a service token from a donor account and notifying the new user (block 750). For example, upon validation of the donor user credentials, MEC API platform 150 may begin steps to transfer rights from the donor account to the new user's account. MEC API platform 150 may remove the existing MEC service token from the donor's account and send a notification to the new user (e.g., via a web portal message, application 185, text message, etc.) announcing the transfer and requesting confirmation.

Process 700 may further include receiving the new user's passcode (block 760), and determining whether the passcode is valid (block 770). For example, MEC API platform 150 may require the new user to enter a passcode or another form of authentication to complete the MEC service token transfer. MEC API platform 150 may verify the new user's passcode to determine if access to the MEC services can be granted.

If access to the MEC services cannot be granted (block 770—No), process 700 may include denying the transfer request (block 740). For example, if the new user is unable to provide a valid passcode, the transfer request can be denied and the MEC service token will remain in the donor's account. If access to the MEC services can be granted (block 770—Yes), process 700 may include generating a new block and adding the new block to the new user's account (block 780). For example, if MEC API platform 150 validates the new user passcode, use rights for MEC services are transferred to the new user's account. In one implementation, the transfer includes updating a block chain for the transferred MEC service token. Thus, the previous version of the MEC service token from the donor's account would no longer be valid for use.

FIG. 8 provides an illustration of a use case for using MEC service tokens in a portion 800 of network environment 100, according to an implementation. In the example of FIG. 8, assume an application developer creates an app (e.g., application 185) that requires backend compute services to act on user activity and establishes an account of MEC service tokens available for the app (e.g., using developer APIs 220). Further assume the developer makes the app available for downloading by user devices.

As shown in reference 802, a user may download the app (e.g., through a third-party app store, a direct download, etc.). The downloaded app may include a MEC service token block identifier associated with the particular developer. As part of the installation process or the app, at reference 804, the developer of the app may provide the user with a private key, which is also made known to MEC API platform 150.

As shown in reference 806, user device 180 (when executing the app) may provide an access request for MEC compute services. The access request may include an authentication code for the user (e.g., the private key) and a unique MEC service token ID (e.g., a block chain ID associated with the developer). In response to the transfer request and as shown at reference 808, MEC API platform 150 may validate the private key.

Assuming the private key is validated, MEC API platform 150 grants MEC service slices commensurate with the token value to the app. More particularly, at reference 810, MEC API platform 150 may provide a grant notification to user device 180 with access information (e.g., a URL) for MEC cluster 135 and service parameters. As shown at reference 812, MEC API platform 150 may also forward token parameters to MEC cluster 135. At reference 814, MEC API platform 150 may submit a block chain update to MEC block chain platform 155 to designate expenditure of the MEC services token. As shown in reference 816, MEC block chain platform 155 may perform block chain encryption and provide a confirmation (e.g., of successful block chain entry) to MEC API platform 150 at reference 818.

Based on information in the service grant notification (reference 810) and the token parameters (reference 812), user device 180 may establish a session with MEC cluster 135 to access MEC slice compute services using the parameters/limits of the MEC service token. If more tokens are needed, the developer can replenish their MEC service tokens or the user may gain more tokens through monetary remuneration, transfers, or other means.

Systems and methods described herein provide decentralized MEC compute services. A wireless carrier can securely deliver MEC compute service slicing via an API over a network to user devices. A user device app may access the user's account to obtain MEC service tokens before allowing access to the MEC compute services. The systems and methods provide developers a way to attach MEC-based cloud compute services to an app that can be monetized or otherwise commuted securely. End users can access cloud services using MEC service tokens as a secure pre-paid model and exchange value and content via a MEC platform. The systems and methods guarantee security of the user's service allocation, also providing secure anonymized content and/or value between apps and users.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5-7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 320, etc.), or a combination of hardware and software (e.g., software 335).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 320) of a device. A non-transitory storage medium includes one or more of the storage mediums described in relation to memory 330.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method, comprising:
   receiving, by a network device in a core network and from a user device, an application programming interface (API) call including a request to transfer a Multi-access Edge Computing (MEC) service token from a donor user account to a recipient user account,
   wherein the MEC service token indicates a service unit of network resources that provide MEC services, and
   wherein the transfer request includes a private key and an account identifier of the recipient user account for the MEC service token;
   determining, by the network device, that the MEC service token is available for transfer;
   sending, by the network device, a notification of the transfer request to a user associated with the account identifier;
   verifying, by the network device, that access to the MEC services by the user can be granted; and
   transferring, by the network device and after the verifying, the MEC service token to the recipient user account, wherein the transferring includes initiating an update to a block chain ledger, corresponding to the account identifier, to reflect the transferring of the MEC service token from the donor account to the recipient user account.

2. The method of claim 1, further comprising:
receiving, by the network device and from a user device executing an instance of an application, an access request for the MEC services, wherein the request includes a unique block chain identifier for the application;
debiting, by the network device, the MEC service token from the recipient user account,
wherein the MEC service token indicates parameters limiting use of network resources that provide the MEC services;
extracting, by the network device, parameters from the MEC service token; and
forwarding, by the network device and to a MEC cluster that provides the MEC services to the instance of the application, the parameters indicated in the MEC service token.

3. The method of claim 1, wherein the MEC service token indicates parameters limiting use of network resources that provide the MEC services to a preconfigured duration of time.

4. The method of claim 1, wherein the verifying includes conducting a payment transaction.

5. The method of claim 1, wherein the MEC service token includes parameters for a duration, a bandwidth, a number of compute cycles, or a memory limit for the MEC services.

6. The method of claim 1, further comprising:
monitoring for usage activity of the MEC service token; and
logging an amount of unused resources, from the MEC service token, that is available for future use.

7. The method of claim 1, wherein the MEC service token indicates a service including one or more of graphics processing, general processing, or storage.

8. The method of claim 1 further comprising:
creating, by the network device, the recipient user account for storing the MEC service token.

9. The method of claim 1, wherein receiving the access transfer request includes:
receiving the API call over a radio access network (RAN).

10. The method of claim 1, wherein sending the notification comprises requesting confirmation from the user.

11. The method of claim 6, further comprising:
generating, after the logging, a new token for the recipient user's account to credit the unused resources back to the user.

12. A network device, comprising:
a first communications interface for exchanging data with a user device;
a second communications interface for exchanging data with a Multi-access Edge Computing (MEC) cluster; and
one or more processors configured to:
receive, from a user device, an application programming interface (API) call including a request to transfer a Multi-access Edge Computing (MEC) service token from a donor user account to a recipient user account,
wherein the MEC service token indicates a service unit of network resources that provide MEC services, and
wherein the transfer request includes a private key and an account identifier of the recipient user account for the MEC service token,
determine that the MEC service token is available for transfer,
send a notification of the transfer request to a user associated with the account identifier,
verify that access to the MEC services by the user can be granted, and
transfer, after the verifying, the MEC service token to the recipient user account, wherein the transferring includes initiating an update to a block chain ledger, corresponding to the account identifier, to reflect the transferring of the MEC service token from the donor account to the recipient user account.

13. The network device of claim 12, wherein, when receiving the transfer request, the one or more processors are further configured to:
receive the API call over a radio access network (RAN).

14. The network device of claim 12, wherein the one or more processors are further configured to:
credit, before receiving the transfer request, the MEC service token to the donor user account.

15. The network device of claim 12, wherein the MEC service token includes parameters for a duration or memory limit of the MEC services that are available to the instance of the application.

16. The network device of claim 12, wherein the one or more processors are further configured to:
receive, from a user device executing an instance of an application, an access request for the MEC services, wherein the request includes a private key and a unique block chain identifier for the application,
debit the MEC service token from the recipient user account, wherein the MEC service token indicates parameters limiting use of network resources that provide the MEC services,
extract parameters from MEC service token, and
forward, to the MEC cluster, the parameters indicated in the MEC service token.

17. The network device of claim 12, wherein, when sending the notification, the one or more processors are further configured to:
request confirmation from the user.

18. A non-transitory computer-readable medium storing instructions executable by a processor to:
receive, from a user device, an access application programming interface (API) call including a request to transfer a Multi-access Edge Computing (MEC) service token from a donor user account to a recipient user account,
wherein the MEC service token indicates a service unit of network resources that provide MEC services, and
wherein the transfer request includes a private key and an account identifier of the recipient user account for the MEC service token,
determine that the MEC service token is available for transfer,
send a notification of the transfer request to a user associated with the account identifier,
verify that access to the MEC services by the user can be granted, and
transfer, after the verifying, the MEC service token to the recipient user account, wherein the transferring includes initiating an update to a block chain ledger, corresponding to the account identifier, to reflect the transferring of the MEC service token from the donor account to the recipient user account.

19. The non-transitory computer-readable medium of claim 18, further comprising instructions to:
credit, before receiving the transfer request, the MEC service token to the donor user account.

20. The non-transitory computer-readable medium of claim 18,
wherein the MEC service token includes parameters for one or more of a duration or an amount of memory.

* * * * *